United States Patent [19]

Ikeda et al.

[11] Patent Number: 5,306,956
[45] Date of Patent: Apr. 26, 1994

[54] CONNECTING SYSTEM FOR SUPPLYING ELECTRICAL POWER TO A DEVICE IN PLACE OF A BATTERY ALONG WITH THE TRANSMISSION OF DATA SIGNALS FROM THE DEVICE TO MONITORING APPARATUS, OR SUPPLYING ELECTRICAL POWER TO A BATTERY FOR THE CHARGING THEREOF

[75] Inventors: Tamon Ikeda, Tokyo; Hiroaki Itoh, Chiba; Yoshihiro Konno, Tokyo, all of Japan

[73] Assignee: Sony Corporation, Japan

[21] Appl. No.: 805,989

[22] Filed: Dec. 12, 1991

[30] Foreign Application Priority Data

Dec. 29, 1990 [JP] Japan ................................ 2-416530

[51] Int. Cl.⁵ .............................................. H02J 7/00
[52] U.S. Cl. ...................................... 307/125; 307/66; 307/85; 320/2
[58] Field of Search .................. 307/125, 139, 150, 46, 307/64, 66; 320/49, 2, 15

[56] References Cited

U.S. PATENT DOCUMENTS

| | | | |
|---|---|---|---|
| 4,965,462 | 9/1990 | Crawford | 307/66 |
| 5,019,767 | 5/1991 | Shirai et al. | 320/2 |
| 5,148,042 | 9/1992 | Nakazoe | 307/65 |
| 5,159,258 | 9/1992 | Kolvites | 320/14 |

*Primary Examiner*—A. D. Pellinen
*Assistant Examiner*—Aditya Krishnan
*Attorney, Agent, or Firm*—Ronald P. Kananen

[57] ABSTRACT

A connecting system includes a connecting apparatus for connecting selectively a power source of a power supply circuit to a battery or to an electronic apparatus. When a turn-over switch is switched to the electronic apparatus, the information signals is transmitted between the connecting means and the electronic apparatus.

8 Claims, 4 Drawing Sheets

CONNECTING SYSTEM FOR SUPPLYING ELECTRICAL POWER TO A DEVICE IN PLACE OF A BATTERY ALONG WITH THE TRANSMISSION OF DATA SIGNALS FROM THE DEVICE TO MONITORING APPARATUS, OR SUPPLYING ELECTRICAL POWER TO A BATTERY FOR THE CHARGING THEREOF

BACKGROUND OF THE INVENTION

The present invention relates to a connecting system which is adaptable in supplying a power source to, for example, a video tape recorder having a camera provided integrally therewith and in connecting the video tape recorder to various video apparatuses.

In a conventional video tape recorder having a camera provided integrally therewith, input/output terminals for video signal and audio signal are provided such that a recorded content can be monitored on an available television receiver.

However, when a body of such a video tape recorder having a camera provided integrally therewith is connected to a television receiver, the connecting procedure is troublesome, causing the connection to tend to be erroneous.

SUMMARY OF THE INVENTION

In view of the foregoing, an object of this invention is to provide a connecting apparatus capable of connecting to external apparatuses easily.

The foregoing object and other objects of the invention have been achieved by the provision of a connecting system which comprises a connecting apparatus 1 which has a power supply circuit 24, a battery receiving means 4 and a turnover switch 28, the battery receiving means 4 being able to receive a first battery 2 to be recharged, and the turn-over switch 28 selectively applying a power source of said power supply circuit 24 to the first battery 4 received by the battery receiving means 4 or to an external electronic apparatus 43 via connection cable 30 together with information signals.

By switching operation of the turn-over switch, the power source of said power supply circuit 24 is selectively supplied to the first battery 2 or to the electronic apparatus 43. In addition, when the turn-over switch 28 is switched to the electronic apparatus 43, the information signals are transmitted between the connecting apparatus 1 and the electronic apparatus 43.

Thereby it is possible to connect the electronic apparatus to various external apparatus by simple connecting operation and to improve the usability of the electronic apparatus.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 1:
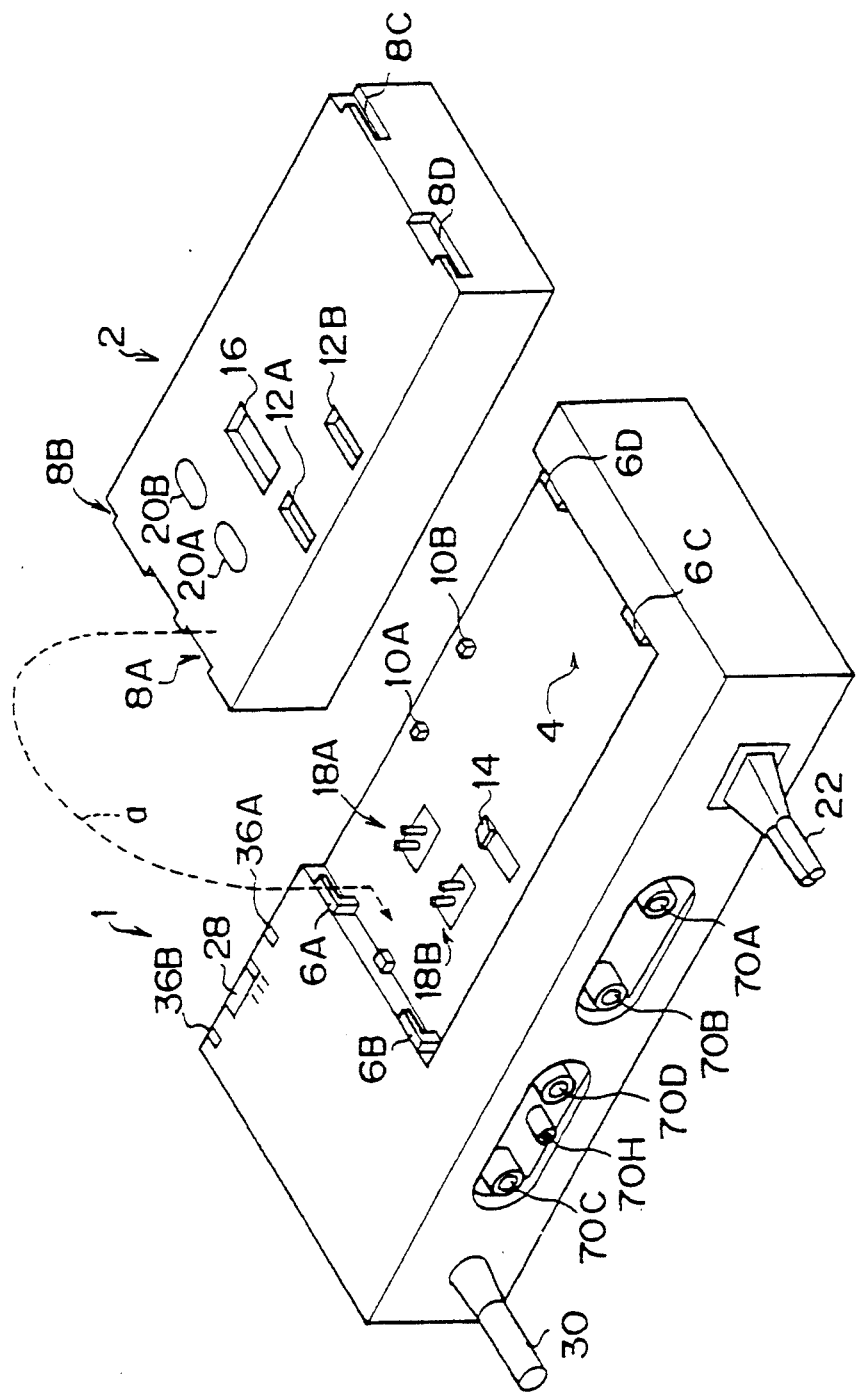
FIG. 1 is a perspective view showing a recharging apparatus according to an embodiment of the present invention.

Preferred embodiments of this invention will be described with reference to the accompanying drawings:

In FIG. 1, 1 shows a recharging apparatus as a whole, which is made possible to recharge a battery 2 of a video tape recorder having a camera provided integrally therewith.

For this, in the recharging apparatus 1, a battery receiving portion 4 is provided on an upper surface, to which the battery 2 can be detachably attached.

That is, the battery receiving portion 4 is formed by recessing an upper surface of the recharging apparatus 1 in a rectangular shape as a whole, and L shaped protrusions 6A - 6D are formed on opposing two sides of the said battery receiving portion 4, the L shaped protrusion being raised from a bottom vertically and then extended in one direction parallel to the upper surface of the recharging apparatus 1.

Correspondingly thereto, L shaped grooves 8A- 8D are formed in the battery 2, and the said battery 2 can be detachably attached to the recharging apparatus 1 as shown by an arrow a and then sliding it laterally.

A pair of rectangular protrusions 10A and 10B are formed on an upper surface of the receiving portion of the recharging apparatus 1 and a pair of rectangular recesses 12A and 12B are formed in a lower surface of the battery 2 correspondingly to the said protrusions 10A and 10B.

With this, in the said recharging apparatus 1, when one tries to mount a battery, etc., which has no such recesses 12A and 12B on the said recharging apparatus 1, the protrusions 10A and 10B collide with a bottom face of the said battery 2 so that the said battery 2 cannot be received, by which it is possible to effectively avoid an erroneous connection of, for example, a battery whose source voltage is different.

Further, the upper surface of the battery receiving portion 4 of the recharging apparatus 1 has a protrusion 14 held downwardly biased and the lower surface of the battery 2 is formed with a rectangular recess 16 corresponding to the protrusion 14.

With this, the recharging apparatus 1, when it receives the battery 2, can hold the battery 2 in the predetermined positioned with the said protrusion 14 being fitted in the recess 16.

Further, power source terminals 18A and 18B are provided on the upper surface of the battery receiving portion 4 of the recharging apparatus 1 by implanting two pins and, when the battery 2 is received, the power source terminals 18A and 18B contact with electrodes 20A and 20B on the side of the battery 2.

With this, the recharging apparatus 1 can supply recharging power source to the battery 2 through the power source terminals 18A and 18B.

Figure 2:
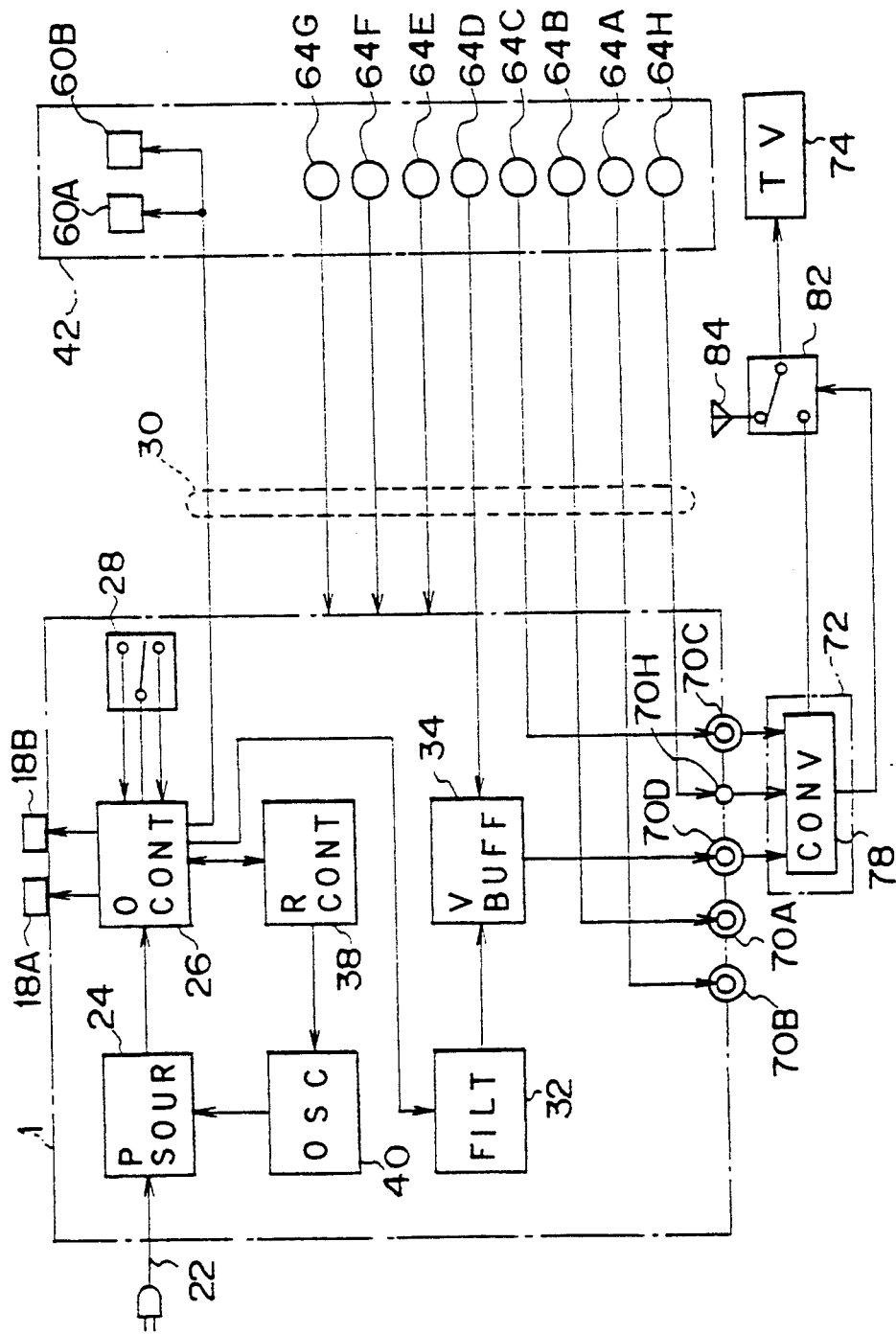
FIG. 2 is a block diagram showing a whole construction thereof.

That is, as shown in FIG. 2, the recharging apparatus 1 provides a commercial power source to a power source circuit 24 through a power source cable 22 and provides a power source outputted from the power source circuit 24 to an output control circuit 26.

The output control circuit 26 responds to an operation of a turn-over switch 28 to output a recharging power source to the power source terminals 18A and 18B and a driving power source for driving the video tape recorder having a camera integrally therewith to a connection cable 30.

Further, the output control circuit 26 supplies a power source to a video buffer circuit 34 through a filter circuit 32.

In this case, when the output control circuit 26 supplies the recharging power source to the power source terminal 18A and 18B, the circuit causes an orange-colored light emitting diode 36A arranged adjacent to the turn-over switch 28 to illuminate (FIG. 1), while, when it supplies a power source to the connection cable 30 and the video buffer circuit 34, it causes a green-colored light emitting diode 36 B to illuminate (FIG. 1).

Further, the output control circuit 26 outputs the recharging power source or the driving power source to a recharging control circuit 38, by which an oscillation portion 40 is controlled to maintain the predetermined voltage of the power source.

Thus, by operating the turn-over switch 28 after the battery 2 is attached to the recharging apparatus 1, the battery 2 can be recharged easily.

Figure 3:
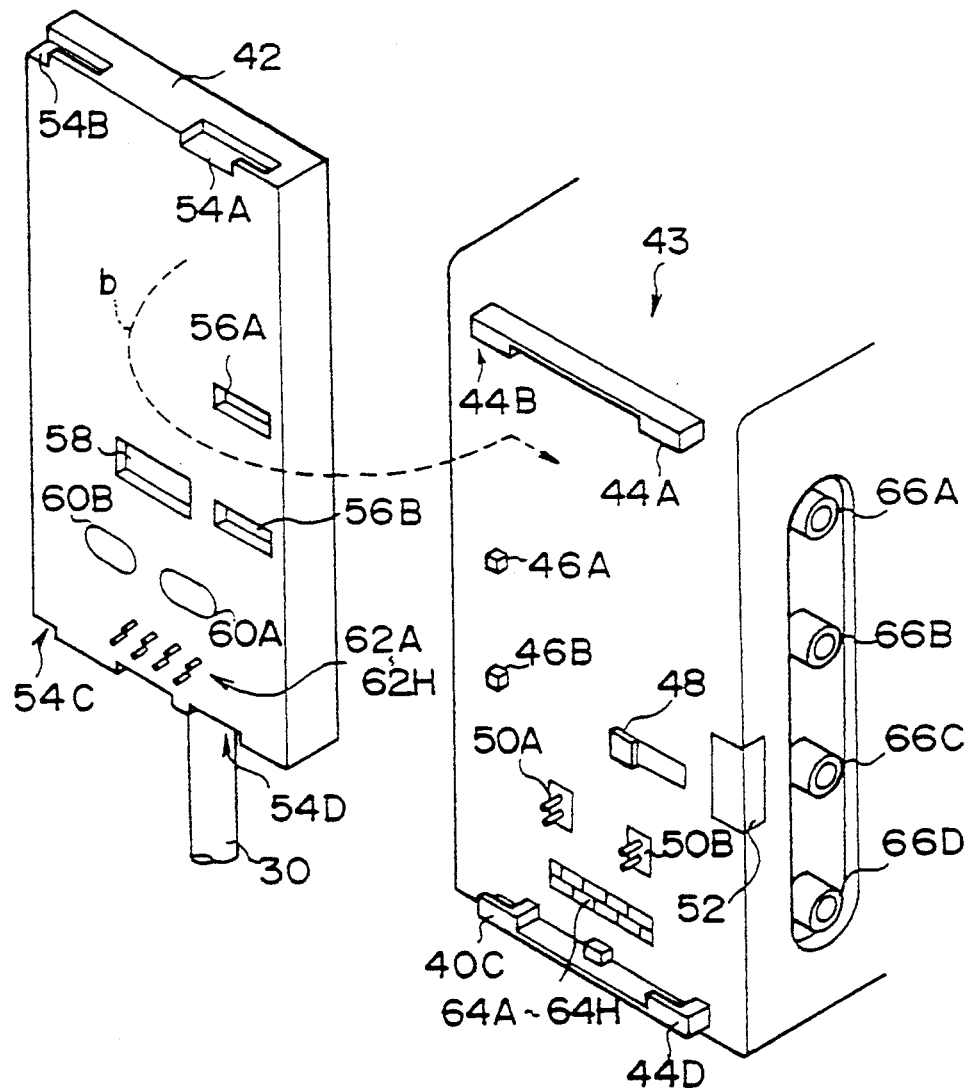
FIG. 3 is a perspective view showing a terminal plate.

As shown in FIG. 3, a terminal plate 42 is connected to a top end of the connection cable 30 so that a power source can be supplied by mounting the terminal plate 42, instead of the battery 2, on the video tape recorder 43 which has a camera integral therewith (hereinafter video tape recorder).

That is, in the video tape recorder 43, in order to receive the battery 2, it has L shaped protrusions 44A– 44D, rectangular protrusions 46A and 46B, 48, power source terminals 50A and 50B similar to the recharging apparatus 1. The battery 2 can be easily received by pushing it against the case of the recharging apparatus 1 and then sliding it laterally.

In this situation, the protrusion 48 is held biased by a spring force and, by depressing a push button 52 provided on a side face of the video tape recorder 43, the amount of protrusion is changed so that the battery 2 can be detached.

Accordingly, in the video tape recorder 43, a driving power source is inputted from the battery 2 through the power source terminals 50A and 50B, and, with a fitting of the protrusion 48 in a recess 58, the battery 2 will not fall off even if the video tape recorder having camera integral therewith 43 is moved manually.

Further, in the video tape recorder 43, similarly to the case of the recharging apparatus 1, erroneous connection of devices such as a battery can be effectively avoided by utilizing the protrusions 46A and 46B.

Similar to the video tape recorder 43, the terminal plate 42 is formed to have substantially the same configuration as that of the battery 2 and is formed with L shaped grooves 54A– 54D similarly to the battery 2.

Further, the terminal plate 42 is formed with rectangular recesses 56A and 56B, 58 correspondingly to the protrusions 46A and 46B, 48 and with electrodes 60A and 60B correspondingly to the power source terminals 50A and 50B.

With this construction, the terminal plate 42, as shown by an arrow b, can be mounted on the video tape recorder 43 easily using the same operation as used in the mounting of the battery 2.

The electrodes 60A and 60B are supplied with power from the recharging apparatus 1 through the connection cable 30, and, by this, when the terminal plate 42 is mounted on the video tape recorder 43, the power source terminals 50A and 50B contact with the electrodes 60A and 60B, respectively, to supply power to the video tape recorder 43 through the electrodes 60A and 60B.

Further, on the terminal plate 42, 8-pin signal terminals 62A– 62H are implanted on a lower portion on the electrodes 60A and 60B and, in the video tape recorder 43, signal electrodes 64A– 64H connected to the respective signal terminals 62A– 62H are correspondingly provided With this terminal plate 42, it is possible to input/output necessary signals between the video tape recorder having camera integral therewith 43, through the signal terminals 62A– 62B.

That is, the respective signal electrodes 64A– 64H are formed from two spring metal pieces and, by holding the respective signal terminals 62A– 62H pinched between the metal pieces, the terminal plate 42 is received while maintaining a reliable contact state after pushing it against the video tape recorder 43 and sliding it into position.

The signal electrodes 64A and 64B, together with audio signal output terminals 66A and 66B provided on a side surface, are connected to an audio signal output circuit of the video tape recorder 43, to output a stereo audio signal recorded/reproduced by the video tape recorder 43.

On the other hand, a signal electrode 64C, together with an audio signal output terminal 66C provided on a side surface, is connected to the audio signal output circuit, to output the monoral audio signal recorded or reproduced by the video tape recorded 43.

Further, a signal electrode 64D, together with a video signal output terminal 66D provided on a side surface, is connected to the video signal output circuit, to output the video signal. Signal electrodes 66E and 66F also output a chroma signal and a luminance signal, respectively.

Further, a signal electrode 64G is connected to a control circuit and, by this, switches the operation of the said video tape recorder 43 on the basis of a control signal inputted to the said signal electrode 64G.

Further, a signal electrode 64H is connected to a control circuit similarly to the signal electrode 64G so that power is supplied when the video tape recorder 43 starts to operate.

Here, the terminal plate 42 inputs/outputs respective signals inputted/outputted between the video tape recorder 43 through the signal terminals 64A– 64H with respect to the recharging apparatus 1 and by way of the connection cable 30.

Accordingly, an audio signal and a video signal can be outputted to desired monitor apparatus through the recharging apparatus 1.

Further, at this time, by the fact that the signal electrodes 64A– 64H are arranged on the face in which the battery 2 is received, when the battery 2 is mounted instead of the terminal plate 42, it is possible to hide the signal electrodes 64A– 64H with the receiving face on the side of the battery, so that unnecessary exposure can be avoided effectively.

In the recharging apparatus 1, a stereo audio signal among signals inputted/outputted through the connection cable 30 is outputted to signal output terminals 70A and 70B provided on a side face (FIG. 1).

Accordingly, the recharging apparatus 1 can output the audio signal outputted from the signal output terminals 70A and 70B to a monitor apparatus so as to monitor the audio signal, on demand.

At this time, in the recharging apparatus 1, it is possible to monitor the audio signal of the video tape recorder by merely mounting the terminal plate 42 instead of the battery 2 and connecting the signal output terminals 70A and 70B instead of the audio signal output terminal 70C in stereo mode.

Further, the recharging apparatus 1 outputs power to an output terminal 70H.

Accordingly, the recharging apparatus 1 can have the output terminals 70C, 70D and 70H connected to a monitor with a television receiver 74 having only an antenna terminal by way of a single converter unit 72.

Figure 4:
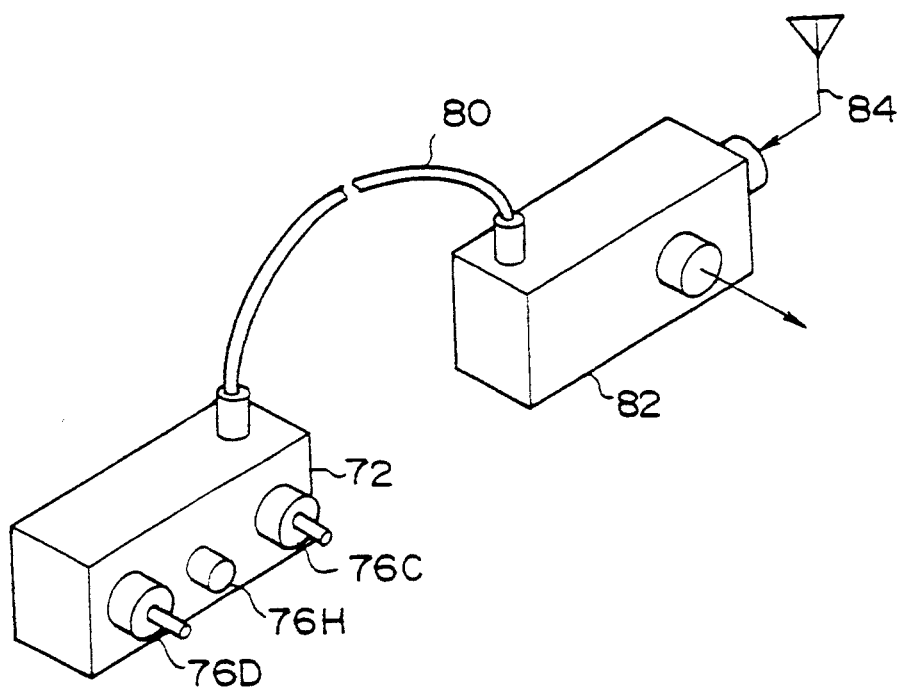
FIG. 4 is a perspective view showing a converter unit.

As shown in FIG. 4, the converter unit 72 has, on its rectangular side face, pin jacks 76C, 76D and 76H corresponding to the output terminals 70C, 70D and 70H and outputs power outputted from the output terminal 70H, to a converter 78 included therein.

Here, the converter 78 modulates the video signal and the audio signal, converts it into a television signal of a predetermined channel and then outputs to an antenna switching unit 82 through a cable 80.

The antenna switching unit 82 outputs, instead of a receiving signal inputted from an antenna 84, the television signal outputted from the converter 78 when the power rises and, by this, it is possible to monitor the video tape recorder 43 easily by merely inserting the antenna switching unit 82 between the antenna 84 and the television receiver 74.

Thus, by connecting the recharging apparatus 1 to various monitor apparatus on demand, monitoring is rendered possible by merely connecting the terminal plate 42 to the video tape recorder 43, and, correspondingly, erroneous connection can be avoided effectively and the utility of the video tape recorder 43 can be improved.

Further, on demand, it is possible to output a control signal to the video tape recorder 43 through the recharging apparatus 1 and output the luminance signal and the chroma signal outputted from the video tape recorder 43 to external apparatuses, and, correspondingly, improve the utility of the video tape recorder 43.

With the above construction, when the video tape recorder 43 is used as a unit, it is possible to mount the battery 2 easily by pushing the battery against the video tape recorder 43 and then sliding it laterally into place.

Accordingly, the electrodes 20A and 20B of the battery contact the power source terminals 50A and 50B of the video tape recorder 43 and it is possible to supply power to the video tape recorder 43.

Further, the face of the battery 2 which is to be received by the video tape recorder 43 converts and hides the signal electrodes 64A- 64H and avoids exposure thereof.

On the other hand, when the battery 2 is recharged, it is possible to mount the battery 2 on the recharging apparatus 1, by pushing the battery 2 against the recharging apparatus 1 and then sliding it laterally.

By operating the turn-over switch 28 under this condition, a recharging power source is supplied through the power source terminals 18A and 18B to the electrodes 20A and 20B of the battery 2, and thus it is possible to recharge the battery 2 simply.

Further, when the video tape recorder 43 is to be driven by the recharging apparatus 1, the terminal plate 42 is connected instead of the battery 2.

By operating the turn-over switch 28 under this condition, the recharging apparatus 1 can supply power through the electrodes 60A and 60B of the terminal plate 42 and the power source terminals 50A and 50B of the video tape recorder 43.

Further, when the video tape recorder 43 is monitored on recording state or reproducing state, the output terminals 70A- 70D provided on the side of the recharging apparatus 1 can be selectively connected to a monitor apparatus.

That is, when an audio signal is monitored in the stereo mode, the audio signal output terminals 70A and 70B are connected to a stereo monitor apparatus.

In this way, the audio signal outputted through the signal electrodes 64A and 64B of the video tape recorder 43 to the signal terminals 62A and 62B of the terminal plate 42 is outputted through the recharging apparatus 1 to the audio signal output terminals 70A and 70B, rendering the monitoring of the audio signal possible.

On the other hand, when a monoral audio signal is monitored, the audio signal output terminal 70C is connected to the monitor apparatus.

Accordingly, an audio signal outputted through the signal electrode 64C of the video tape recorder 43 to the signal terminal 62C of the terminal plate 42 is outputted to the audio signal output terminal 70C through the recharging apparatus 1, rendering the monitoring of a monoral audio signal possible.

Further, when a television receiver 74 has only an antenna input, the output terminals 70C, 70D and 70H are connected to the converter unit 72 and the antenna switching unit 82 is inserted between the antenna 84 and the television receiver 74.

With this, it is possible to monitor the video signal through the television receiver 74.

According to the construction mentioned above, it is possible to (a) output necessary signals to various monitoring apparatuses through the recharging apparatus by forming the terminal plate 42 such that it can be received by the video tape recorder 43 similarly to the battery 2, (b) supply power of the recharging apparatus 1 to the video tape recorder 43 by mounting it on the video tape recorder 43 similarly to the said battery 2, (c) provide the signal terminals 62A- 62H on the said terminal plate 42, separately, and (d) input/output necessary signals between the video tape recorder 43 and the recharging apparatus through the said signal terminals 62A- 62H.

Thus, with the video tape recorder 43, through the simple operation of merely connecting the terminal plate 42 instead of the battery 2, it is possible to monitor using various different monitoring devices and thus improve the utility of the video tape recorder 43 correspondingly.

In the embodiment described above, although the case where the recharging apparatus 1 outputs the video signal has been described, the present invention is not limited thereto and it may be possible to output the luminance signal or the chroma signal if desired.

Further, in the described embodiment, although the present invention has been described as applied to the connection of the video tape recorder, the present invention is not limited thereto, it is applicable to connections between various electronic apparatuses such as digital audio tape recorder, etc.

According to the present invention mentioned above, by supplying power through the terminal plate which can be received by the electronic apparatus body instead of the battery and inputting/outputting necessary signals, it is possible to connect the electronic apparatus to various external apparatuses through a simple connecting operation and to improve the utility of the same.

While a description has been given only in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A connecting system comprising a connecting apparatus which has a power supply circuit, a battery receiving means and a turn-over switch:

said battery receiving means being able to receive a first battery to be recharged; and said turn-over switch selectively applying a power source of said power supply circuit to one of said first battery received by said battery receiving means and an external electronic apparatus through an elongate flexible connection cable, said connection cable also transmitting information signals to said electronic apparatus.

2. The connecting system according to claim 1, wherein:

said connection cable is connected to a terminal plate means which has power supplying terminals and signal transmitting terminals on an attaching surface;

said electronic apparatus has a battery mounting means for mounting a second battery which supplies a power source to said electronic apparatus;

said battery mounting means being constructed so as to be compatible for mounting with either said terminal plate means or said second battery;

said battery mounting means having power supplying terminals and signal transmitting terminals;

wherein when said second battery is mounted to said battery mounting means, the power source of said second battery is supplied to said electronic apparatus through the power supplying terminals of said electronic apparatus; and wherein when said terminal plate means is mounted to said battery mounting means in place of said second battery, power from the power source of said connecting apparatus is supplied to said electronic apparatus through the power supplying terminals of said electronic apparatus, and information signals are transmitted between said connecting apparatus and said electronic apparatus through the signal transmitting terminals of said terminal plate means and said electronic apparatus.

3. A connecting system comprising:

a connecting apparatus which has a power supply circuit, a battery receiving means, and a turn-over switch:

said battery receiving means being able to receive a first battery to be recharged; and said turn-over switch selectively applying a power source of said power supply circuit to one of said first battery received by said battery receiving means and an external electronic apparatus through an elongate flexible connection cable, said connection cable also transmitting information signals to said electronic apparatus, wherein said connection cable is connected to a terminal plate means which has power supplying terminals and signal transmitting terminals on an attaching surface;

said electronic apparatus has a battery mounting means for mounting a second battery which supplies a power source to said electronic apparatus;

said battery mounting means being constructed so as to be compatible for mounting with either said terminal plate means or said second battery;

said battery mounting means having power supplying terminals and signal transmitting terminals;

wherein when said second battery is mounted to said battery mounting means, the power source of said second battery is supplied to said electronic apparatus through the power supplying terminals of said electronic apparatus;

wherein when said terminal plate means is mounted to said battery mounting means in place of said second battery, power from the power source of said connecting apparatus is supplied to said electronic apparatus through the power supplying terminals of said electronic apparatus, and information signals are transmitted between said connecting apparatus and said electronic apparatus through the signal transmitting terminals of said terminal plate means and said electronic apparatus and wherein:

said connecting apparatus has monitor terminals; and when said terminal plate means is mounted to said battery mounting means of said electronic apparatus, the information signals transmitted through said connection cable are outputted from the monitor terminals of said connecting apparatus to an external monitor.

4. The connecting system according to claim 2, wherein:

said connecting apparatus has monitor terminals for connecting an external converter unit which is connected to an antenna switching unit;

said antenna switching unit being able to selectively switch a television receiver to an antenna or to said converter unit;

wherein when said terminal plate means is mounted to said battery mounting means of said electronic apparatus, the information signal transmitted through said connection cable is outputted from the monitor terminals of said connecting apparatus to said television receiver through said antenna switching unit.

5. The connecting system according to claim 1, wherein said electronic apparatus is a video tape recorder having an integral camera.

6. The connecting system according to claim 2, wherein said electronic apparatus is a video tape recorder having an integral camera.

7. The connecting system according to claim 3, wherein said electronic apparatus is a video tape recorder having an integral camera.

8. The connecting system according to claim 4, wherein said electronic apparatus is a video tape recorder having an integral camera.

* * * * *